March 26, 1957 A. SENKOWSKI ET AL 2,786,402
POWER OPERATING SYSTEM FOR TRACTOR HITCH LINKAGES
Filed Oct. 19, 1953 10 Sheets-Sheet 1
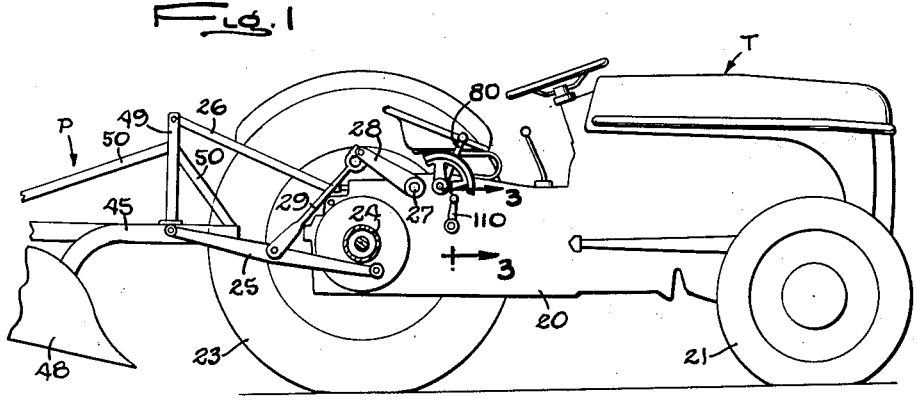
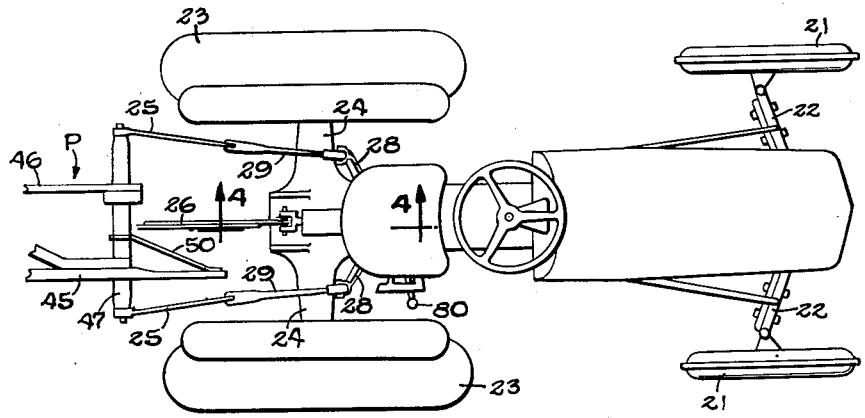
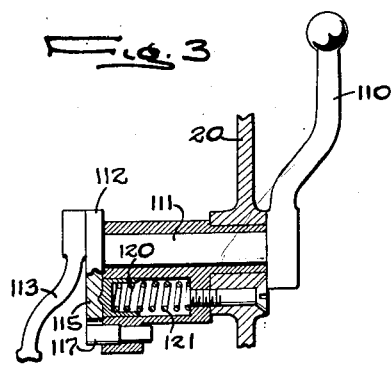
INVENTORS
Alexander Senkowski
Frederick D. Cooper
By Carlson, Pitzner, Hubbard & Wolfe
ATTORNEY

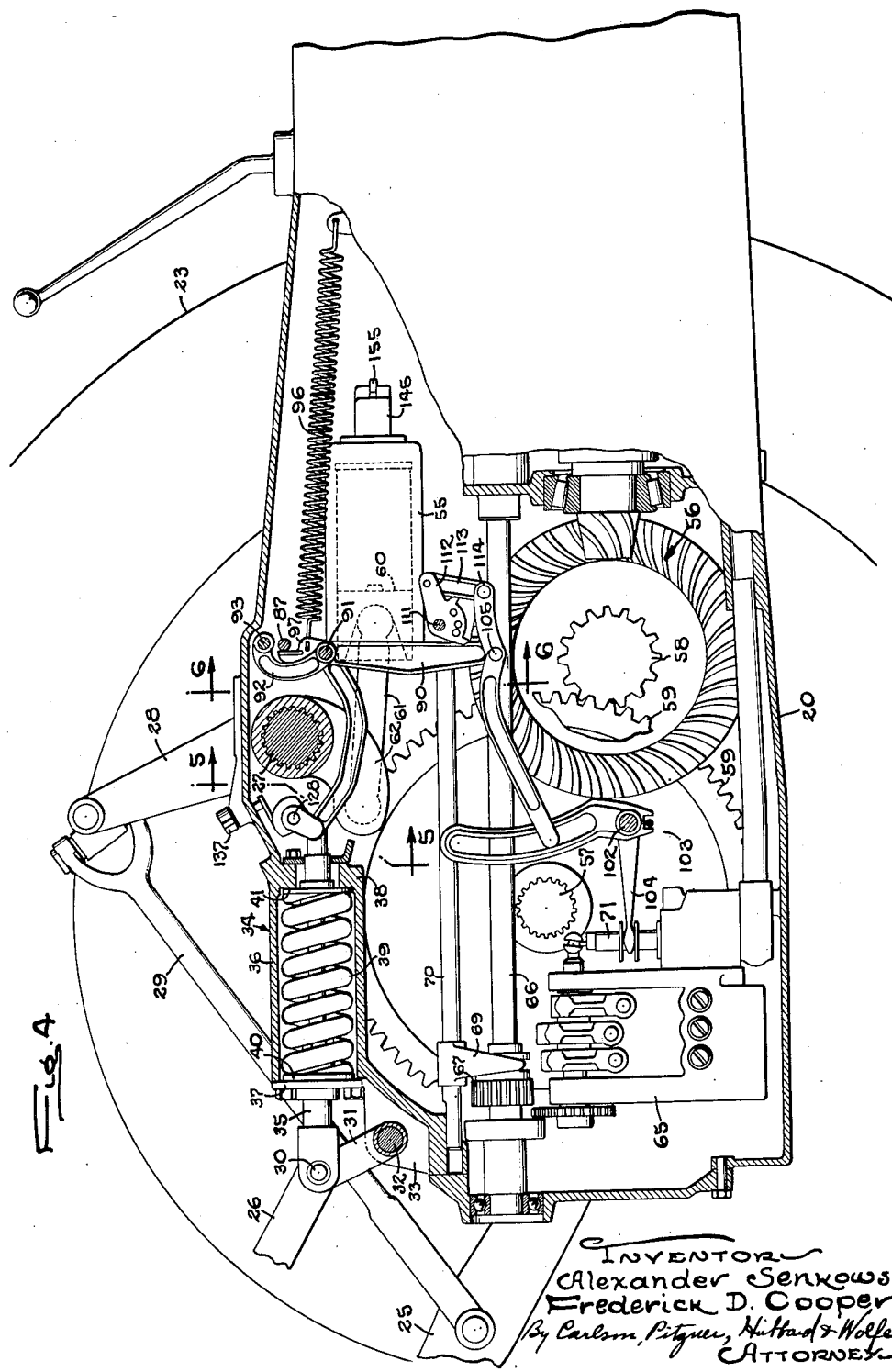

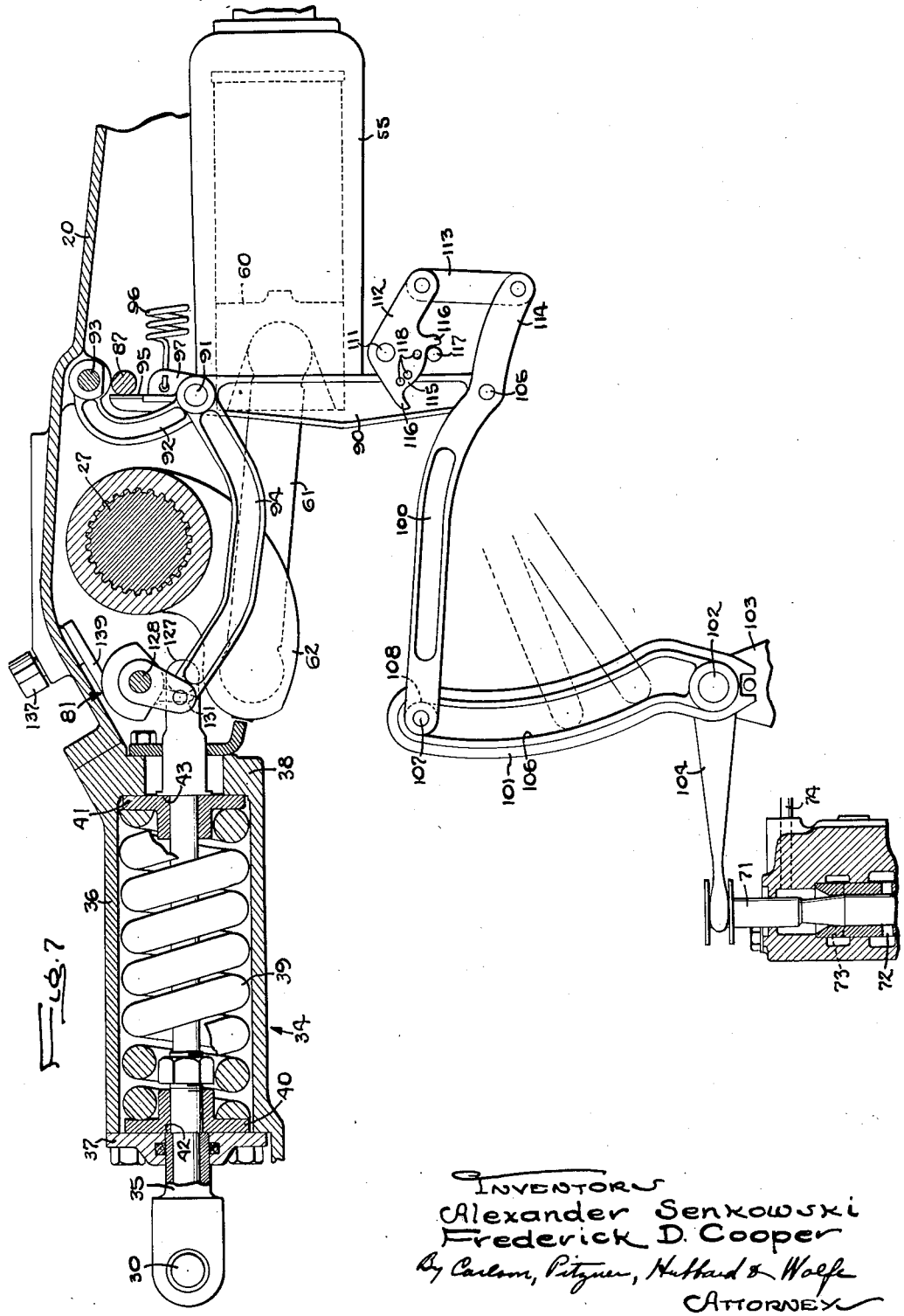

March 26, 1957 A. SENKOWSKI ET AL 2,786,402
POWER OPERATING SYSTEM FOR TRACTOR HITCH LINKAGES
Filed Oct. 19, 1953 10 Sheets-Sheet 5
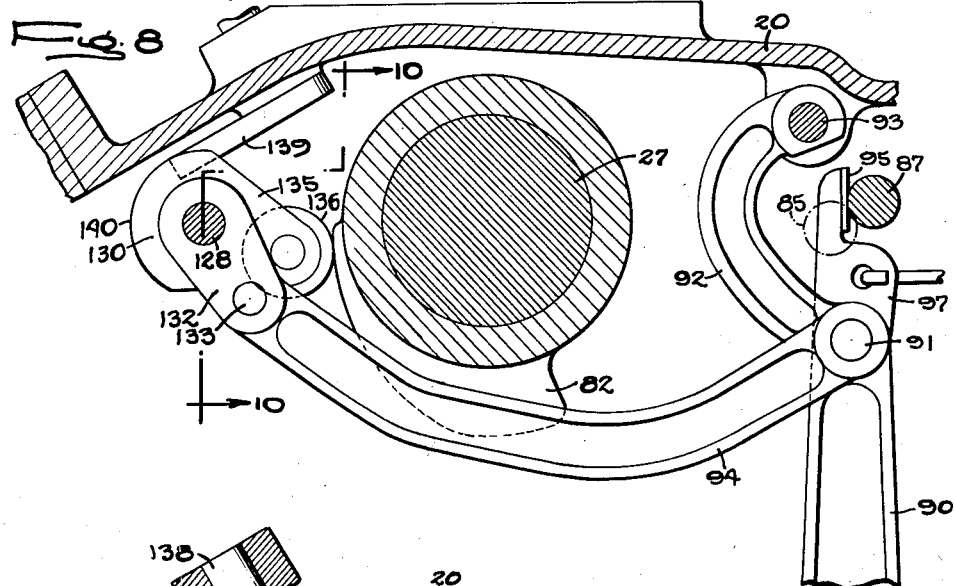
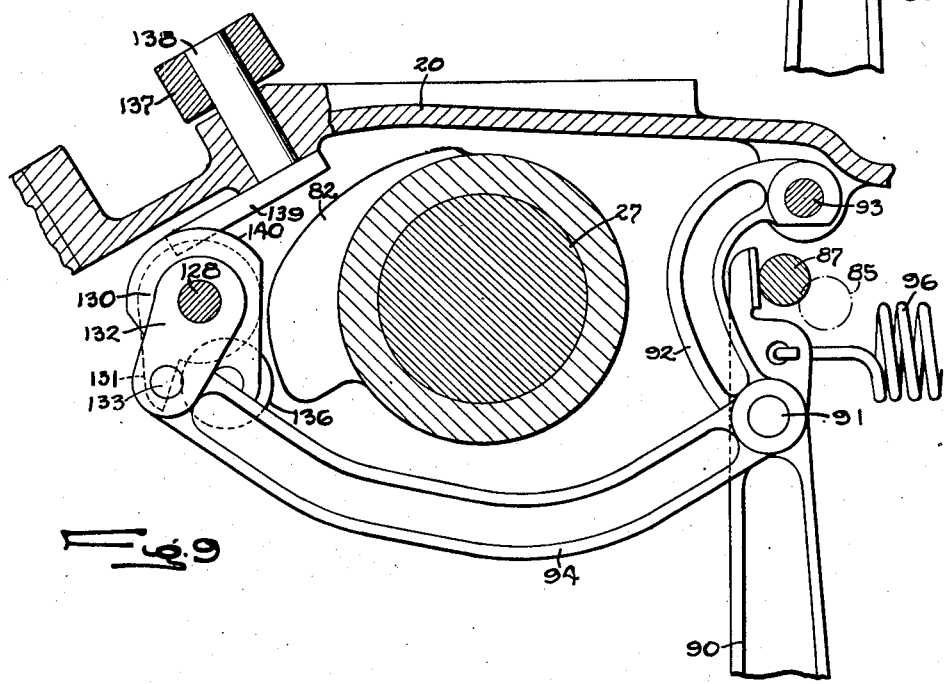
INVENTORS
Alexander Senkowski
Frederick D. Cooper
By Carlson, Pitzner, Hubbard & Wolfe
ATTORNEYS

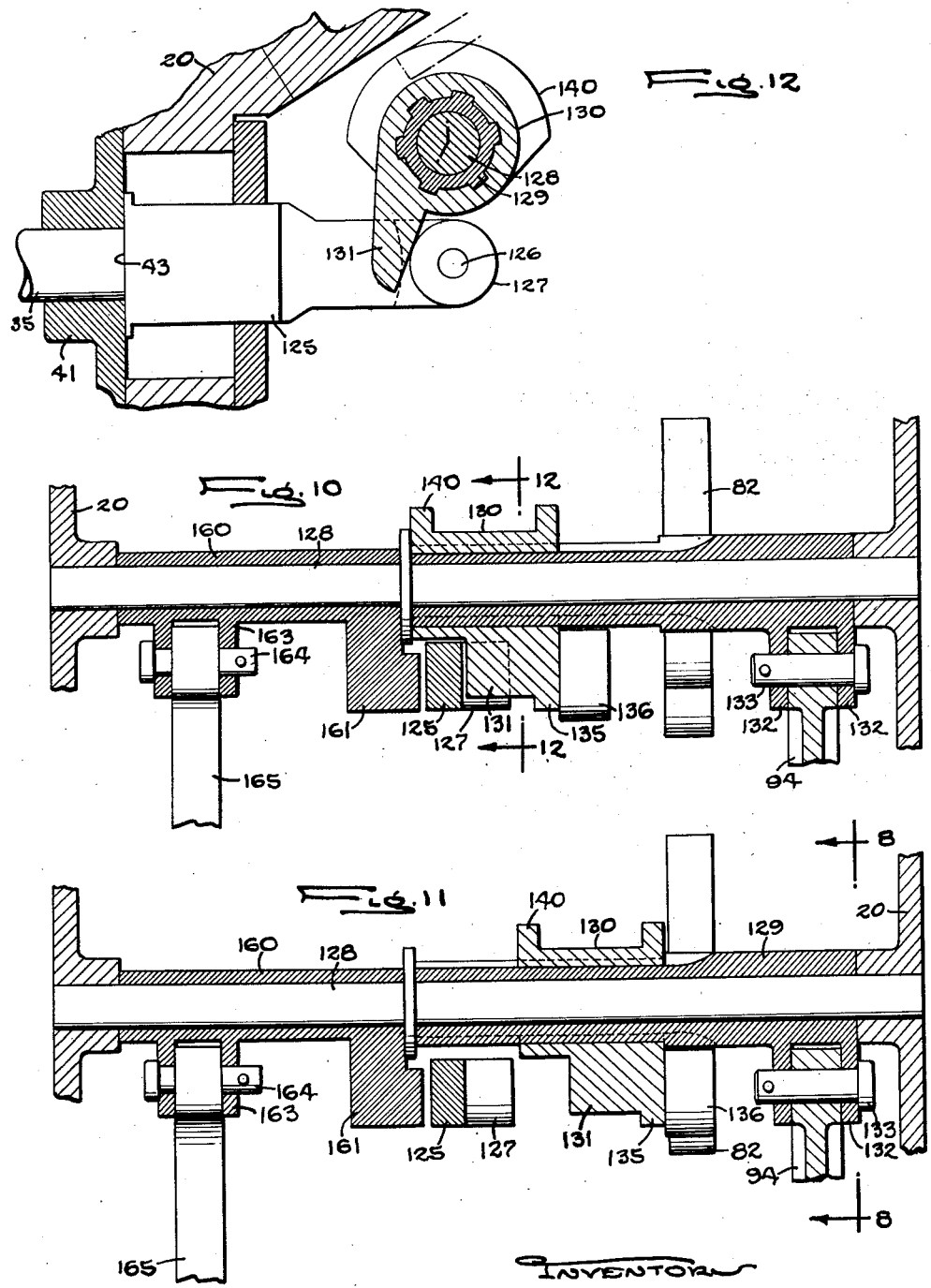

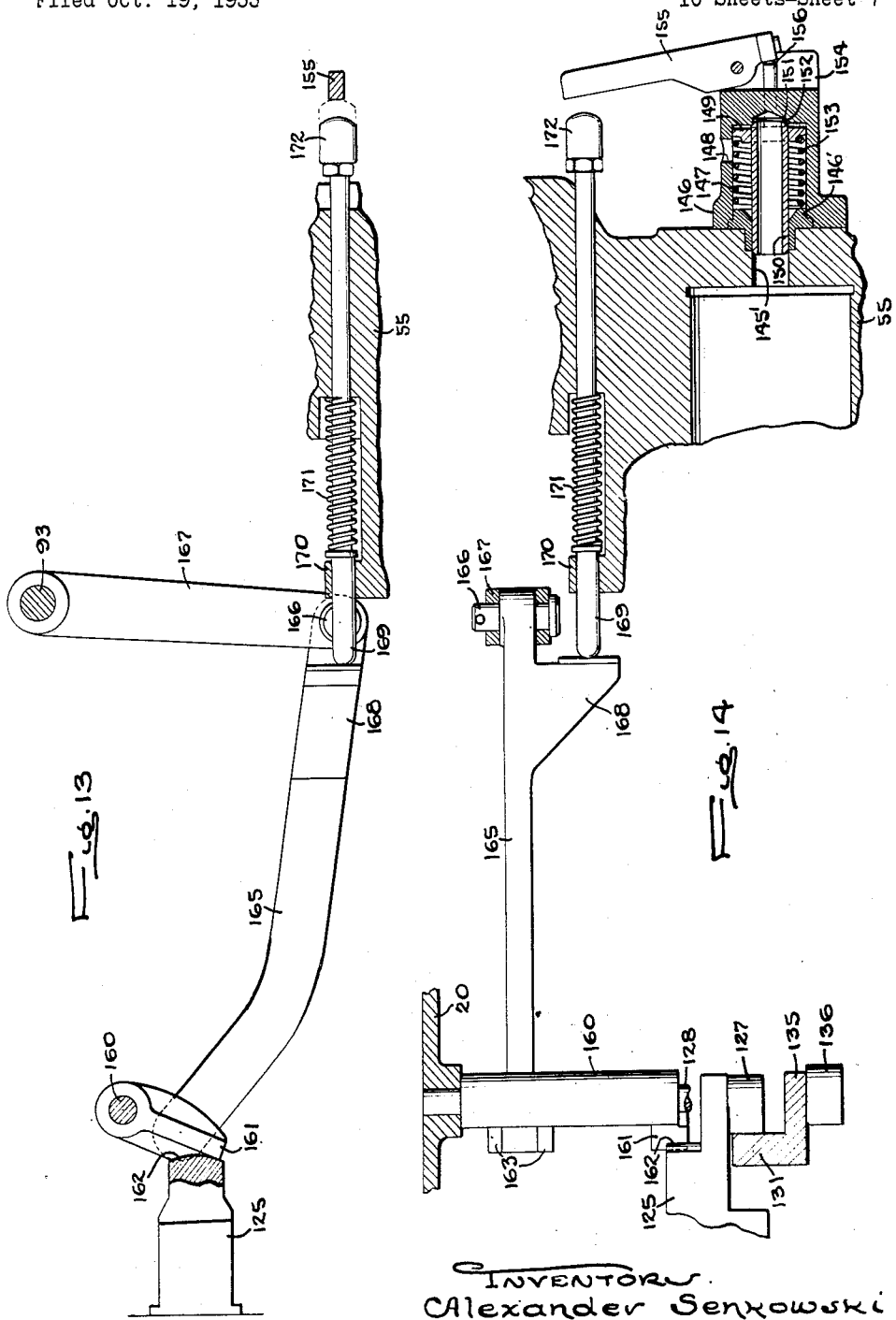

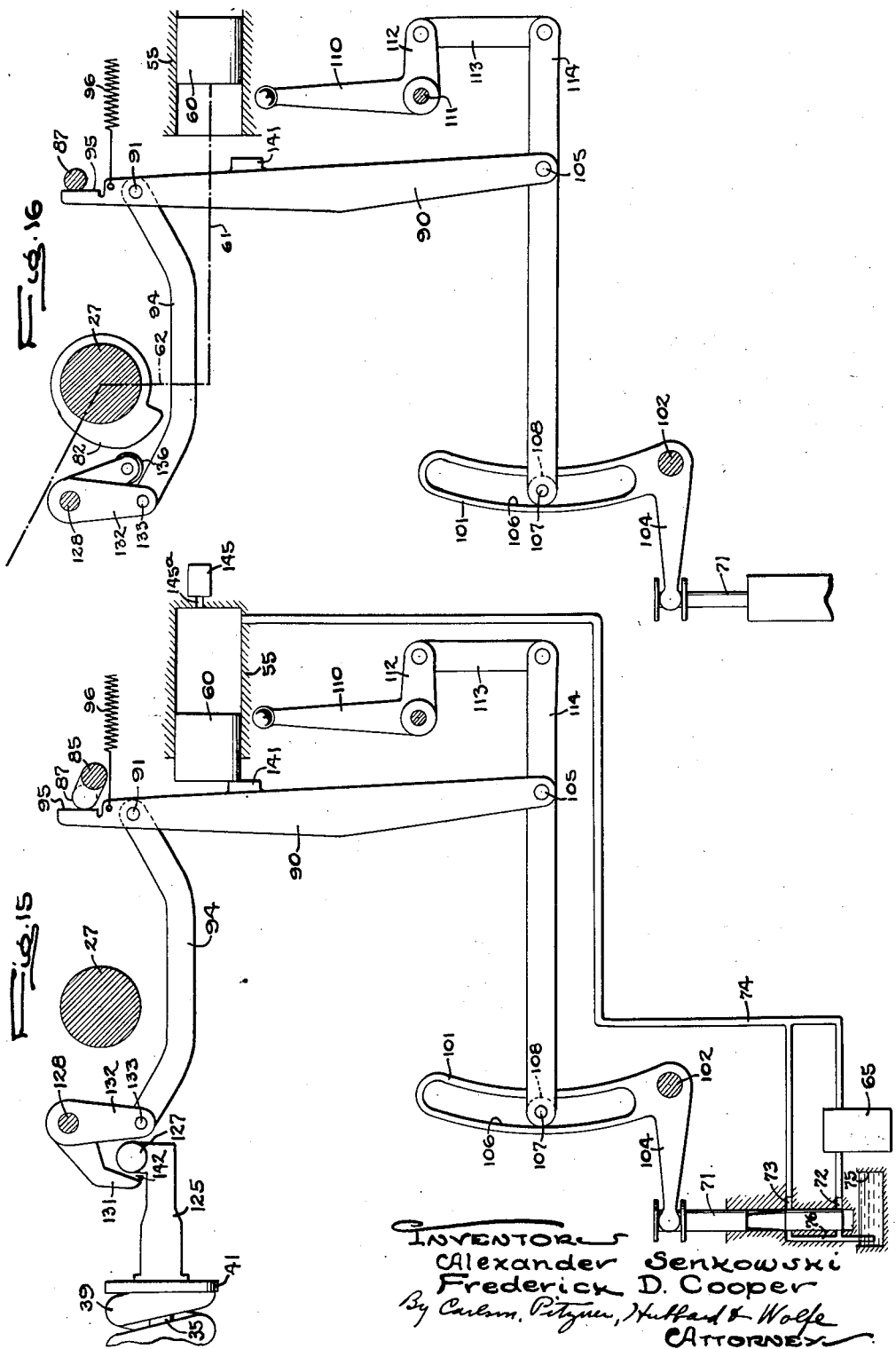

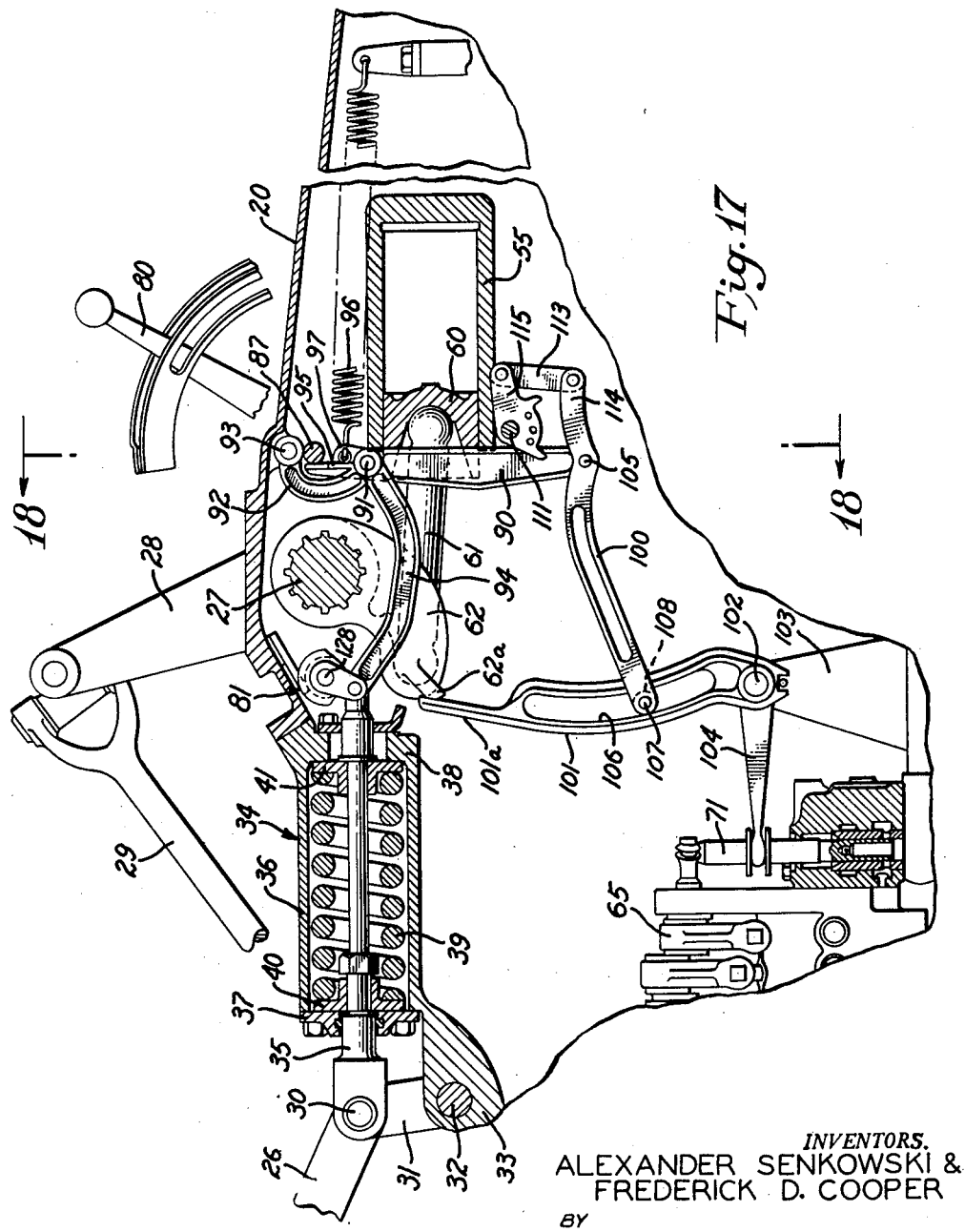

INVENTORS.
ALEXANDER SENKOWSKI &
FREDERICK D. COOPER
ATTORNEYS.

United States Patent Office 2,786,402
Patented Mar. 26, 1957

2,786,402

POWER OPERATING SYSTEM FOR TRACTOR HITCH LINKAGES

Alexander Senkowski, Earlsdon, Coventry, and Frederick D. Cooper, Stoke, Coventry, England, assignors to Massey-Harris-Ferguson (Sales) Limited, a British company Application October 19, 1953, Serial No. 386,822

Claims priority, application Great Britain May 16, 1952

16 Claims. (Cl. 97—46.07)

This invention relates to power operating systems for tractor hitch linkages having load responsive controls for automatically maintaining an attached implement at a selected substantially uniform working depth and more particularly to improved controls for such systems. The present application is a continuation-in-part of applicants' copending application Serial No. 354,907, filed May 14, 1953, now abandoned.

The invention is concerned primarily with systems of the general type disclosed in the Ferguson Patent No. 2,118,180 issued May 24, 1938, in which implements are coupled to the tractor by a trailingly pivoted hitch linkage adapted to be raised and lowered by a hydraulic power unit on the tractor. In such systems operation of the power unit is controlled by means responsive to the draft load imposed on the hitch linkage by the implement attached thereto. More particularly, the implement is connected to the hitch linkage in a manner such that the ground reaction thereon, that is, the resistance to its forward movement in working engagement with the ground, tends to rock the implement forwardly. Such forward rocking is opposed by a balancing spring provided on the tractor which determines the extent of displacement from a neutral position of a shiftable control element upon increase or decrease of the draft load. Displacement of the control element initiates operation of the power unit to raise or lower the hitch linkage and implement as required to restore the system to a balanced condition. Manually operable means incorporated in the system provides for adjustment of the controls to maintain a selected ground reaction or draft on the implement, permitting the latter to be held substantially at any selected working depth within its operating range.

In systems of the type shown in the above-mentioned patent, the sensitivity of response to changes in the draft load is determined by the characteristics of the balancing spring. The spring must, of course, be sufficiently powerful to oppose the heavy loads imposed on it by heavy draft implements such as plows where load variations on the order of several hundred pounds occur upon relatively small changes in the working depth. Other types of implements adapted for use with such hitch systems, for example, cultivators, are subject to comparatively little ground reaction and consequently the forces available for actuating the controls are quite small, too small, in fact, to operate the controls effectively when a spring heavy enough for use with plows is employed.

The provision of separate interchangeable control springs for each type of implement affords no solution of the problem since the interchange of springs is a laborious and time consuming operation that cannot be done in the field. Controls adjustable for sensitivity without requiring a change of control springs have been devised, the generic forms being shown in the copending applications of Ernest V. Bunting, Serial No. 97,640, filed June 7, 1949, now Patent No. 2,715,863, and Serial No. 254,305, filed November 1, 1951. The particular mechanisms in which those controls have been embodied provide a range of adjustment adapted to take care of load variations encountered in the operation of implements ordinarily used with small farm tractors of the type described in the trade as "two-bottom plow" tractors. In the case of larger tractors, such, for example, as "four-bottom plow" tractors, the range of draft variations encountered is much greater than can be accommodated by those adjustable controls.

With the above in view, one object of the invention is to provide improved control mechanism embodying the basic principles taught in the Bunting applications and extending the range of adjustment for sensitivity to better adapt the controls for use with "four-bottom plow" tractors.

A more specific object is to provide an improved motion transmitting linkage between the load responsive element and the control valve of the system which is adjustable to vary the ratio of the movements of the valve to movements of the draft responsive element through a much wider range than has been practicable heretofore.

Another object is to provide a control system of the above type characterized by its simplicity and compactness but which, nevertheless, affords a range of adjustment capable of adapting a "four-bottom plow" tractor for efficient operation with any type of implement designed for use with tractors equipped for automatic draft control.

Still another object is to provide a motion transmitting linkage of the type above referred to wherein change in sensitivity is effected by varying the pivotal connection of one link with another along the axis of the latter link.

A further object is to provide for a control mechanism of the above general type and motion transmitting linkage affording a one-way connection between the load responsive element and the valve to eliminate excessive shock load on the latter when the ground reaction on an implement is suddenly increased.

It is also an object of the invention to provide improved means whereby the control system may be readily adapted for either automatic draft control or position control with the latter acting independently of the draft load.

Another object of the invention is to provide means for cutting off the movement of the actuator when the hitch and any implement on it are raised to a predetermined transport position, independently of variable settings for the sensitivity adjusting means.

It is still another object to provide in such a control system transport shutoff means which is operative in response to the position of the actuator and which is independent of sensitivity adjustments, further enhanced in that its action produces a smooth stopping of the implement being lifted as the latter reaches transport position.

Other objects and advantages of the invention will become apparent from the following detailed description of the preferred embodiment illustrated in the accompanying drawings in which:

Figure 1 is a side elevational view of a tractor equipped with power operating mechanism and controls embodying the features of the invention, a typical implement being shown as attached to the hitch linkage operated by the power system.

Figure 2 is a plan view of the tractor and implement shown in Fig. 1.

Fig. 3 is a fragmentary sectional view taken in a vertical plane substantially on the line 3—3 of Fig. 1 showing details of the manual operator for adjusting the sensitivity of the control system.

Fig. 4 is a longitudinal sectional view of the rear part of the tractor taken in a plane substantially on the line 4—4 of Fig. 2.

Fig. 7 is a fragmentary longitudinal sectional view taken along the same line as Fig. 4 but showing the parts on an enlarged scale.

Fig. 8 is a fragmentary sectional view taken in a plane substantially on the line 8—8 of Fig. 11 showing details of the position control mechanism.

Fig. 9 is a fragmentary sectional view similar to Fig. 8 but showing the relationship of the parts when the hitch linkage is raised.

Fig. 10 is a fragmentary sectional view taken generally along the line 10—10 of Fig. 8 showing the controls set for automatic draft control.

Fig. 11 is a sectional view similar to Fig. 10 showing the controls set for position control.

Fig. 12 is a fragmentary sectional view taken in a plane substantially on the line 12—12 of Fig. 10.

Fig. 13 is a fragmentary sectional view taken in a plane substantially on the line 13—13 of Fig. 6 showing details of the overload release mechanism.

Fig. 14 is a top view of the mechanism shown in Fig. 13.

Fig. 15 is a diagrammatic view showing the control system set for automatic draft control.

Fig. 16 is a diagrammatic view similar to Fig. 15 but showing the system set for position control.

Fig. 17 is a view similar to Fig. 4, illustrating an improved modification of the control for effecting transport shutoff.

Figure 5:
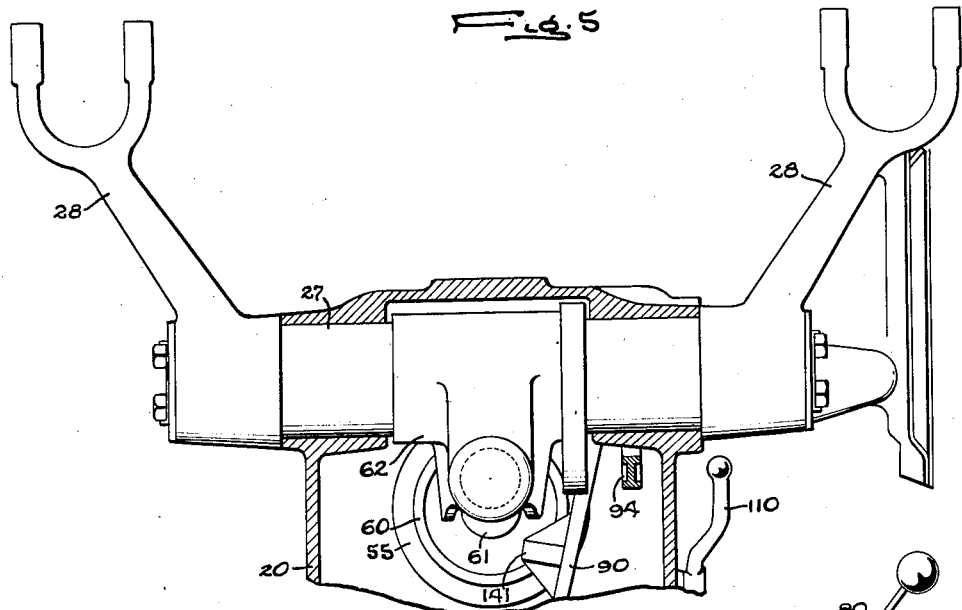
Fig. 5 is a fragmentary transverse sectional view through the rear part of the tractor body taken in a plane substantially on the line 5—5 of Fig. 4.

For purposes of illustration, preferred embodiments of the invention have been shown and will be described in detail herein. It is not the intention, however, that the detailed character of the disclosure should limit the invention but, on the contrary, it is merely intended to illustrate what now appears to be the most desirable form of the invention. It is our intention to cover all modifications and alternative constructions falling within the spirit and scope of the invention as more broadly and generally characterized in the appended claims.

By way of illustration, the invention has been shown as incorporated in a tractor T equipped with a power operated hitch linkage operating on the principles exemplified in the system shown in the above-mentioned Ferguson patent. The tractor itself is of the same general type as that shown in the Ferguson patent but is substantially larger and higher powered. It may, for example, be a tractor of the type disclosed in the copending application of Alexander Senkowski and Arthur Lynes, Serial No. 354,904, filed May 14, 1953.

*The tractor and hitch mechanism*

Referring to Figs. 1 and 2 of the drawings, the exemplary tractor T has an elongated body or center housing 20 supported on its front end by suitable wheels 21 carried on adjustable axle arms 22. Support for the rear end of the tractor is provided by wheels 23 carried on axle housings 24 projecting from opposite sides of the center housing, the wheels 23, in this instance, being the traction wheels for driving the tractor.

For attachment of implements, the tractor is equipped with a three element hitch linkage comprising a pair of lower or draft links 25 and an upper or top link 26. The draft links are universally pivoted at their forward ends on the tractor housing below and slightly forward of the rear axle. They are adapted to be raised or lowered by a power unit enclosed in the tractor housing acting through a rockshaft 27 journaled on the upper part of the housing and having radially projecting arms 28 connected by drop links 29 with the respective draft links.

The top link 26 of the hitch linkage is pivotally connected as by a pin 30 with the upper end of a rocker member 31 which in turn is pivotally supported at its lower end by a pin 32 coacting with apertured lugs 33 on the rear portion of the tractor housing. Forward thrust on the link 26 tends to swing the rocker member 31 forwardly while tension on the link tends to pull it rearwardly. A control spring assembly 34 acts to balance the load on the implement as reflected in the forces applied through the top link, the spring assembly being interposed between the rocker member and the tractor body so as to resist movement of the link in either direction from a neutral or balanced position.

The spring assembly 34 illustrated is generally similar to that disclosed in the Chambers and Bunting Patent No. 2,437,875, issued March 16, 1948. In general, it comprises a control element or plunger 35 pivotally secured to the rocker member 31 by a pin 30 and extending forwardly through a casing 36 into the tractor housing 20. The casing 36, which may be formed integral with the rear section of the housing 20, defines a cylindrical chamber closed at one end by a removably mounted plate 37 and at the other end by a transverse wall 38 apertured to receive and guide the plunger 35 for endwise sliding movement. The plunger is yieldably retained in a central or balanced position by a coiled compression spring 39 enclosed in the casing 36 and interposed between spaced collars 40 and 41 slidably mounted on the plunger and respectively abutting inwardly facing shoulders 42 and 43 formed on the plunger.

In accordance with the usual practice, suitable connecting means are provided at the rear ends of the three hitch links 25 and 26 for pivotal attachment of an implement to be operated as a unit with a tractor. By way of illustration, a two-bottom moldboard plow P has been shown attached to the linkage. The plow illustrated has two beams 45 and 46 rigidly mounted on a transverse member or drawbar 47 provided with pins at opposite ends for engaging with the connecting means the ends of the hitch links 25. It will be understood that each of the beams 45 and 46 supports a plow bottom 48. It will also be understood that other types of implements may be attached to the linkage and the particular tractor shown is adapted for operation with plows equipped with more than two bottoms if desired.

For connection with the top link 26 of the hitch linkage, an upright rigid strut 49 is provided on the implement P preferably substantially centrally of the drawbar 47. In the implement shown, the strut is held rigidly in upright position by diagonal braces 50. Top link 26 is universally pivoted at its rear end to the upper part of the strut 49 in the conventional manner.

With the above arrangement, the pivotal mounting on the lower draft links permits limited rocking movement of the implement fore-and-aft. Ground reaction on the implement or resistance to its forward movement in engagement with the ground, of course, creates a turning moment on the implement tending to rock it forwardly. The ground reaction, of course, varies with different types of implements. With most implements, it is usually sufficient to overcome the oppositely directed movement produced by the overhanging weight of the implement and thus impose a forwardly directed force on the top link 26. In either case, however, this force, whether in compression or tension, is resisted by the spring 39 so that the plunger 35 is displaced from its normal or neutral position an amount proportional to the draft force imposed on the linkage by the implement. The plunger and its spring thus constitute draft responsive means by which the power unit is controlled as will appear presently.

*Hydraulic power unit*

The hydraulic power unit for raising and lowering the hitch linkage is similar in its operating principles to that shown in the aforementioned Ferguson patent. It includes a one-way ram comprising a cylinder 55 (Figs. 4 and 7) suitably supported in the tractor housing 20 above the tractor's differential 56 which, in this instance, is located ahead of the rear axle and arranged to drive axle shafts 57 for the two traction wheels through the medium of pinions 58 meshing with bull gears 59 fixed on the respective axle shafts.

The ram cylinder 55, which opens to the rear of the tractor, has a working piston 60 slidable therein from which a piston rod 61 projects rearwardly. The piston rod has its ball-shaped outer end engaging in the socketed lower end of an arm 62 rigid with the rockshaft 27. Accordingly, upon admission of pressure fluid to the closed end of the cylinder 55, the piston 60 is thrust rearwardly to rock the shaft 27 and crank arms 28 in a direction to raise the draft links 25 and the implement attached thereto. Conversely, upon exhaust of fluid from the cylinder 55, the piston 60 is permitted to advance into the cylinder under the urging of the gravity load on the draft links and the links and attached implement move downwardly in a lowering direction.

Pressure fluid, such as oil, is supplied to the ram or actuator from a positive displacement of the pump 65 (Fig. 4) powered from the tractor engine by way of a continuously running power takeoff shaft 66. A disengageable driving connection between the shaft and the pump is afforded by a gear 67 splined to the shaft 66 and slidable longitudinally thereof into and out of meshing engagement with a gear 68 on the pump shaft. Engagement and disengagement of the drive is effected through a shifter fork 69 and shifter rod 70 adapted to be actuated through the medium of a hand lever (not shown) accessible to the operator of the tractor, as shown in the copending application of Alexander Senkowski and Arthur Lynes, Serial No. 354,904, filed May 14, 1953.

The pump 65 may be of any preferred construction, that shown being similar to the pump disclosed in the copending application of Alexander Senkowski and Frederick Cooper, Serial No. 354,905, filed May 14, 1953.

Supply and exhaust of fluid to and from the ram cylinder for correspondingly raising and lowering the hitch linkage is accomplished by shiftable valve mechanism preferably associated with the intake side of the pump so that the latter may be driven continuously without recirculating fluid during idle periods of the system. The valve mechanism shown is similar to that disclosed in the Senkowski and Cooper application above mentioned. Its mode of operation is illustrated diagrammatically in Fig. 15 wherein it will be observed that a sliding plunger 71 is arranged to control a set of intake ports 72 for the pump 65 and a set of restricted bleed ports 73 communicating with a supply conduit 74 leading from the discharge side of the pump to the ram cylinder 55.

Briefly, the arrangement of the valve mechanism is such that the valve plunger 71 in its neutral or "off" position blocks both the intake ports 72 and bleed ports 73 and thus locks fluid in the ram cylinder so that the linkage and attached implement are held against movement either up or down. Upon upward movement of the plunger 71 to its "raising" position, the pump ports 72 are uncovered admitting fluid to the pump from a sump 75 by way of conduit 76. The fluid thus admitted to the pump is delivered under pressure through the supply conduit 74 to the ram cylinder, thereby forcing the piston 60 rearwardly.

When the valve plunger 71 is shifted downwardly to its "lowering" position, the pump ports 72 remain blocked and the bleed ports 73 are uncovered to permit exhaust of fluid from the ram cylinder 55. Lowering of the hitch linkage and attached implement proceeds until the valve is returned to neutral position.

Control linkage

A linkage type mechanical connection is provided for actuating the valve plunger 71 under the joint control of either a manually operable lever 80, called the quadrant lever, and the draft responsive means or plunger 35 (for automatic draft control) or that quadrant lever and a position control member movable in unison with the raising and lowering movements of the hitch linkage (for position control). Selection between the two types of operation is effected by selector mechanism 81 adapted to operatively associate the linkage either with the draft responsive plunger 35 or the position responsive control member above referred to and herein shown as a cam 82 fixed to and rotatable with the rockshaft 27 which carries the lift arms 28.

Figure 6:
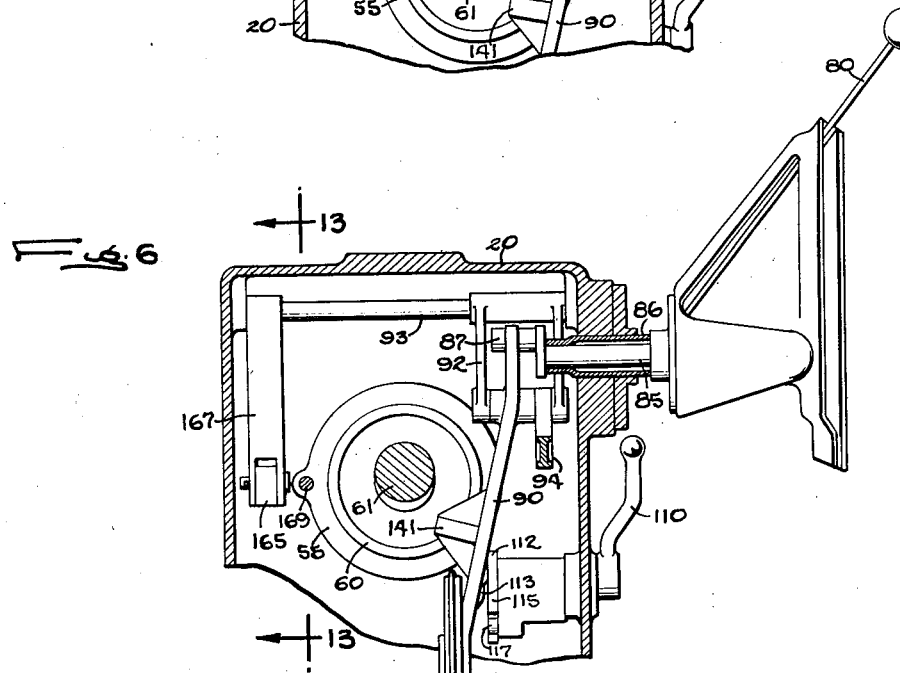
Fig. 6 is a fragmentary transverse sectional view through the tractor body taken generally along the line 6—6 of Fig. 4.

As shown in Fig. 6, the quadrant lever 80 is fixed on the outer end of a shaft 85 journaled in a bearing 86 carried on one side wall of the tractor housing 20. The shaft 85 extends into the housing and, at its inner end, carries an eccentric abutment 87 through which its controlling action on the linkage is effected, as will appear presently.

Referring more particularly to Figs. 4, 6, and 7 of the drawings, the valve operating linkage in its preferred form includes a first lever 90 pivotally supported adjacent its upper end as by a pin 91 at the lower end of double armed suspension link 92 pivoted on and depending from a transverse shaft 93 mounted within the tractor housing 20. A rigid link 94 also pivoted on the pin 91 extends rearwardly to the selector mechanism 81 to provide an operative connection between the draft and position mechanisms and the linkage.

The upper end of the lever 90 is extended beyond its pivot 91 on the link 92 and is formed with a forwardly facing pad 95 adapted to engage and fulcrum on the eccentric abutment 87 of the quadrant lever shaft. A coiled tension spring 96 connected between a stationary part of the tractor housing and a lug 97 on the lever 90 between the pivot 91 and the eccentric 87 yieldably maintains the pad in engagement with the eccentric. By virtue of the suspension link 92, the lever 90 is made "floating," i. e., the lever 90 may rock about the abutment 87 as a fulcrum as the link 94 and the control element 35 shift back and forth; or the lever 90 may rock about the pivot 91 as the abutment 87 is shifted in response to positioning of the quadrant lever.

At its lower end, the lever 90 is connected by a rigid link 100 with a second lever 101 constituting one arm of a bell crank lever pivotally supported by a pin 102 on a bracket 103 upstanding from the bottom of the tractor housing 20. The bell crank lever has its other arm 104 extended generally rearwardly and is forked for operative engagement with a grooved extension of the valve plunger 71. Rocking of the bell crank lever about its pivot is thus effective to shift the valve plunger between raising and lowering positions.

Sensitivity adjustment

In accordance with one aspect of the invention, provision is made in the connecting linkage above described for adjustment whereby its motion transmitting effectiveness can be selectively varied through a wide range without altering the relative positions of the valve plunger and the control member. More particularly, adjusting means is incorporated in the linkage connection to condition it for imparting different degrees of movement to the valve plunger 71 for a given movement of the control member 35. Thus the rate at which the power unit responds to forces acting on the draft responsive means or the "sensitivity" of the system can be regulated to suit the particular implement attached to the linkage or the particular soil condition encountered by the implement.

In the preferred form of the linkage, adjustment for sensitivity is effected by varying the point of connection of the link 100 with respect to one of the levers 90 and 101 which that link connects. As herein shown (Figs. 4, 7, 15 and 16), the link 100 has a fixed pivotal connection with the lever 90 and a connection with the lever 101 which is adjustable relative to the pivot 102 of that lever. The pivotal connection with the lever 90 is provided by a pin 105 while the connection with the lever 101 is preferably of the pin and slot type. More particularly, as shown in Fig. 7, the lever 101 is formed with an elongated longitudinally disposed slot 106 for the reception of a pin 107 fixed to and projecting laterally from one end of the link 100. The pin 107 may advantageously carry a sleeve bearing or roller 108 for engagement with the walls of the slot.

An important consideration in the functioning of the linkage in a tractor power system is the arcuate formation of the slot 106. Preferably the slot is arcuately formed on a radius equal to the effective length of the link 100 between the pins 105 and 107 and centered on the pin 105. Accordingly, the link 100 may be swung about its pivot without changing the relationship of the levers 90 and 101 and consequently without disturbing the setting of the valve plunger 71. Sensitivity adjustments may thus be made while the tractor and implement combination is in operation without interfering with the implement position as determined by the setting of the quadrant lever 80 and the position of the control plunger 35.

It will be evident that changes in the position of the link 100 with respect to the pivot of the lever 101 will materially vary the extent of movement of the valve plunger 71 for any given movement of the control plunger 35 as reflected by the swinging of the lever 101. Thus, when the link 100 is positioned with the pin 107 in the upper end of the slot 106, that is the end remote from the pivot of the lever as shown in full lines in Fig. 7, the valve plunger will be shifted a minimum amount for a given movement of the plunger 35. As the link 100 is swung downwardly or toward the pivot of the lever 101, the ratio of valve movement to plunger movement increases until with the link in the lowermost position shown in broken lines in Fig. 7 the valve plunger receives its maximum increment of movement for a given movement of the control plunger.

Any suitable mechanism may be utilized for adjusting the position of the link 100. As herein shown, the adjustment is effected through the medium of a hand lever 110 (Figs. 3 and 6) fixed on the outer end of a shaft 111, journaled in a fitting 112, carried on a side wall of the tractor housing 20, preferably in the vicinity of the quadrant lever 80. At its inner end the shaft 111 is fitted with a crank arm 112 connected by a link 113 with an extension 114 of the link 100. Accordingly, the link 100 may be swung into its various adjusted positions by appropriate rocking of the shaft 111.

In addition to providing non-interfering sensitivity adjustment, the linkage is constructed and arranged to minimize interference with the sensitivity adjustments by reason of changes in the relationship of the elements due to their operation by the draft responsive means. More particularly, the elements of the linkage and the several pivots above mentioned are arranged and related to minimize shifting of the pin 107 in the slot 106 due to swinging of the levers 90 and 101 about their pivots.

Obviously, the pivot 105 of the link 100 will swing through an arc as the lever 90 swings in response to changes in the draft load. Consequently, it cannot always lie at the center of curvature of the slot 106. The elements are therefore arranged so that the pivot 105 lies on such center when the valve plunger is in the neutral position. Furthermore, in this position of the valve levers 90 and 101 and the link 113 are disposed substantially vertically. As the link 113 is relatively short, it therefore tends to swing the link 100 a slight amount about its pivot 105 in the swinging of the lever 90 and thus tends to keep the pin 107 at a fixed point in the slot 106. In other words, the slight swing of the link 100 compensates for changes in the lever arm ratio due to the swinging of the lever 101.

Provision is desirably made for releasably retaining the sensitivity adjusting mechanism in any one of a number of selected positions of adjustment. For this purpose there is fixed to the shaft 111 a segmental plate 115 having a pair of radially projecting ears 116 positioned to cooperate with a stop pin 117 to define the limit positions of the adjusting lever and associated parts. Stop plate 115 is also formed with a series of shallow recesses 118 for cooperation with a yieldable detent 120 in locating the hand lever in various selected positions of adjustment. As shown in Fig. 3, the detent 120 is in the form of a sleeve closed at one end and yieldably urged by a spring 121 to project its tapered end into one of the recesses 118. In the particular arrangement shown in Fig. 7, three of the recesses 118 are arranged to provide three different degrees of sensitivity.

*Position and automatic draft control selection*

Selection between automatic draft control and position control is effected through the medium of the selector mechanism 81 which, as mentioned heretofore, is adapted to operatively associate the connecting linkage above described with either the plunger 35 of the draft responsive means or the position control cam 82 on the rockshaft 27. Referring to Figs. 10–12 of the drawings, the plunger 35 has threaded or otherwise rigidly secured to its forward end a head 125 defining a movable abutment. In the particular embodiment illustrated, this abutment is in the form of a pin 126 projecting laterally from the head 125 and carrying a roller 127. Supported within the tractor housing 20 above the forward end of the plunger 35 is a cross shaft 128 journaling an elongated sleeve 129 to which is splined a spool 130. Rigid with and projecting radially from the spool 130 is a finger or pawl 131 adapted to be interposed behind the roller 127. Spaced lugs 132 depending from the sleeve 129 define a crank arm to which the link 94 is pivotally connected as by a pin 133. The force exerted on the lever 90 by the spring 96 urges the link 94 forwardly and thus tends to rock the sleeve 129 to a limit position determined by engagement of the pawl 131 with the plunger-carried roller 127. As the plunger moves rearwardly, it acts through the pawl to rock the sleeve and thus transmit corresponding movement through the linkage to the valve plunger 71. Conversely, as the plunger moves forwardly the pawl follows under the urging of the spring 96 and the valve plunger is shifted in the opposite direction.

The one-way connection provided by the pawl and roller arrangement above discussed is advantageous in that the linkage is protected from sudden or excessive shock upon application of sudden compressive loads to the top link 26 of the tractor. Furthermore, with this one-way connection, vibrations and oscillations set up by the implement are not transmitted to the linkage to the same extent as in the case of a direct mechanical connection. Construction is also simplified since the need for breakout means to protect the linkage against excessive loads on the control plunger is avoided.

For conditioning the system for position control, the spool 130 is formed with a radially projecting arm 135 carrying a follower roller 136. By shifting the spool 130 on the sleeve 129 from the draft control position in which it is shown in Fig. 10 to the position control setting in which it is shown in Fig. 11, the pawl 131 is withdrawn from the path of the plunger roller 127 and the follower roller 136 is positioned for coaction with the cam 82.

Suitable manually operable means is provided for shifting the spool between its two operating positions above described. As shown in Figs. 8 and 9, the shifting means in its preferred form comprises a hand lever 137 fixed on the upper end of a shaft 138 journaled in the upper part of the tractor housing 20 where it may be easily reached by the driver of the tractor. At its inner end the shaft 138 is fitted with a shifter arm 139 disposed between spaced flanges 140 upstanding from opposite ends of the spool 130. Suitable detent means (not shown) may be provided for releasably retaining the shifting means in either operative position and, if desired, also in an intermediate position in which both the draft control and position control means are inoperative.

The cam 82, as employed in the exemplary control system is a profile cam so generated that it will tend to return the valve plunger 71 to neutral position when shifted therefrom in either direction by manipulation of the quadrant lever 80. More particularly, the cam 82 acts to control the followup movement of the linkage initiated upon a shift of the quadrant lever by interrupting the supply of pressure fluid to the ram when the hitch linkage has been raised or lowered to a position corresponding to that to which the quadrant lever has been shifted.

Transport shutoff

Provision is made for automatically shifting the valve plunger 71 to neutral position when the hitch linkage is raised to its maximum height, that is, to what is commonly referred to as the transport position. For that purpose in the arrangement illustrated by Figs. 4, 5, 6, 15, and 16, the lever 90 is formed with a laterally projecting abutment 141 positioned for engagement by the skirt of the piston 60 as it approaches its limit position in the implement raising direction. The piston, acting through the abutment 141, swings the lever in a direction to shift the valve plunger 71 from its raising position to neutral position, thus terminating the supply of pressure fluid to the ram cylinder.

The one-way connections to the valve shifting linkage afforded by the selecting mechanism 81 above described is additionally advantageous in providing for the physical separation of the linkage from both the draft responsive means and the position control means when the system is in transport position. As shown in Fig. 15, for example, with the system in transport position the pawl 131 is separated from the plunger roller 127 by an appreciable gap as indicated at 142. Consequently, the valve actuating linkage and the valve plunger will not be operated by the bouncing of the implement as when the tractor is driven over rough ground.

Referring to Fig. 9, it will be observed that when the system is in transport position, the cam follower roller 136 is retracted sufficiently to clear the highest point on the cam 82. This permits the spool 130 to be shifted between draft control and position control settings without interference. If the changeover is attempted at any other time, either the pawl 131 or the roller 136 may be blocked by the roller 127 or cam 82 and thus prevent operative association of the valve linkage with the control means. However, in that case the initial shifting of the spool frees the valve actuating linkage from the control means with which it was previously associated and allows the spring 96 to take over and shift the valve plunger to "raising" position. It does this by swinging the lever 90 in a direction to move the valve plunger 91 upwardly, thereby opening the pump intake ports and initiating a flow of pressure fluid to the ram to raise the hitch linkage. Upon reaching transport position, the fluid supply to the ram is interrupted as above explained and the changeover from position to draft control or vice versa can be made without interference.

The transport shutoff action provided by the abutment 141 on the lever 90 and engaged by the skirt of piston 60 is reliable and positive, although there may be some variation in the exact transport position of the hitch linkage when the sensitivity adjusting link 100 is set to different positions relative to the lever 101. In another aspect, the change in the ratio of movements for the plunger 35 and the valve element 71 may also change the ratio of movements for the piston 60 and the valve element 71 so that transport shutoff occurs with varying degrees of deceleration for the implement as it is stopped in transport position.

In accordance with another feature of the invention, provision is made for effecting transport shutoff independently of the sensitivity adjustment, i. e., with a uniform action regardless of the sensitivity setting. Additionally, such provision makes possible a relatively low ratio of movement between the hydraulic actuator and the control mechanism, so that the latter is neutralized relatively slowly and the implement brought to a smooth stop as it reaches the transport position.

Figure 18:
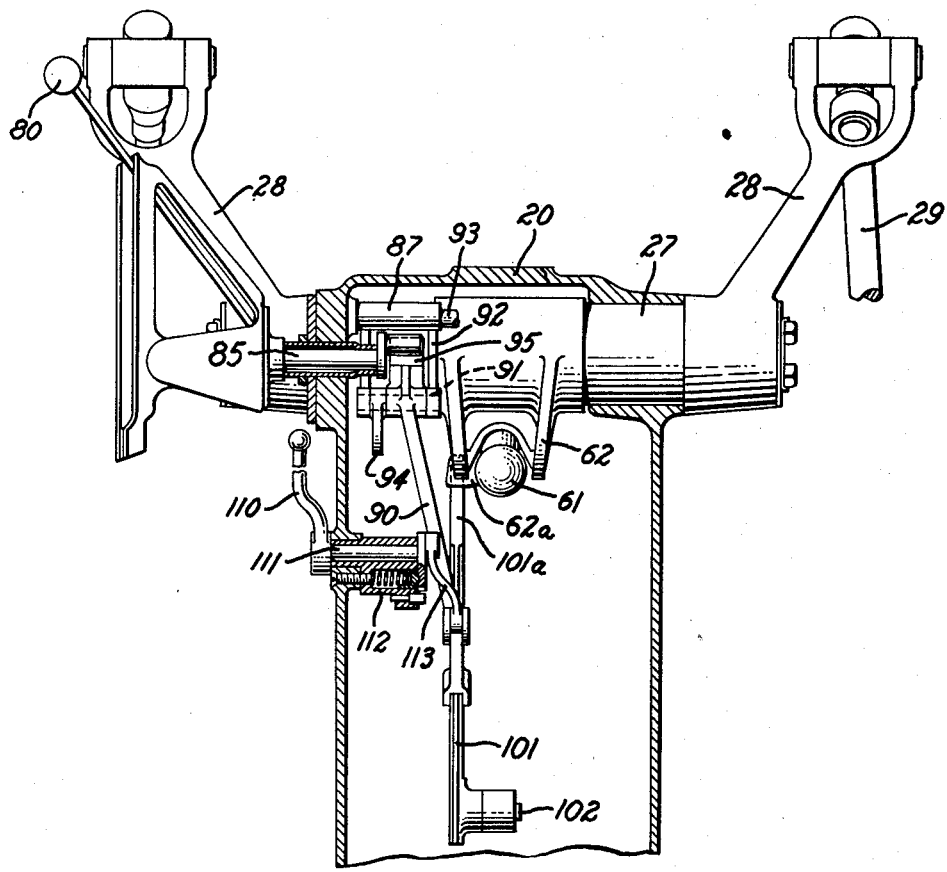
Fig. 18 is a vertical section taken substantially along the line 18—18 in Fig. 17.

Turning now to the exemplary modified and preferred construction shown in Figs. 17 and 18, the same reference characters for corresponding elements appearing in Fig. 4 have been employed. The preferred transport shutoff means is, in this instance, provided by an ear or striker 62a on the rockshaft 27 adapted to engage a longitudinal extension 101a projecting upwardly from the second lever 101. As here shown, the striker 62a may be formed integrally with the arm 62 and located to engage extension 101a, thus rocking the lever 101 and its arm 104 when the projecting arms 28 have reached a predetermined location placing an implement on the draft links in transport position. The extension 101a provides a relatively long arm on which the striker 62a acts in lowering the valve plunger 71 to neutral position for cutting off the supply of pressure fluid to the ram cylinder 55.

The construction and function of the remaining elements shown in Figs. 17 and 18 are as previously described. It will be understood, however, that since the striker 62a is moved directly with the piston 60 and the projecting arms 28, and acts directly on the extension 101a of the lever 101, sensitivity adjustments or positioning of the intermediate link 100 along the arcuate slot 106 in no way affects the point of neutralization or the deceleration with which the implement is stopped as it is raised to transport position. Since, as previously explained, the sensitivity adjustments made by swinging the link 100 about its pin 105 to translate the roller 108 along the slot 106 does not appreciably vary the position of the lever 101, the striker 62a will always hit the extension 101a when the implement has reached a given predetermined position. The implement's transport position is therefore the same regardless of the sensitivity setting. On the other hand, the action of the striker 62a in rocking the lever 101 does not change or affect the sensitivity adjustment, but merely rocks the lever 90 to open a gap 142 between the roller 127 and the pawl 131 as shown in Fig. 15. The length of lever 101 and its extension 101a provides a low ratio of movement between the piston 60 and valve plunger 71 as shutoff occurs. For example, the ratio of movement may be in the order of 2-to-1 so that the plunger 71 is moved relatively slowly to its neutral position, gradually stopping the supply of pressure fluid to the cylinder 55 and bringing the implement to a smooth stop in transport position.

Emergency overload release

Special provision has been made for unloading the system automatically in case the draft load on the hitch linkage exceeds a safe value as when the attached implement strikes an obstruction. As taught in the Ferguson Patent No. 2,118,181, it is desirable under such conditions that fluid be vented from the main ram so that the traction load on the tractor's rear wheels is relieved to allow them to spin freely, thus avoiding damage to the implement or the tractor.

In the exemplary system, venting of the ram cylinder 55 is effected by means of a valve 145 shown in Fig. 4 as mounted on the ram cylinder adjacent its closed end. The valve may be of any preferred construction, that shown being generally similar to the valve disclosed in the co-pending Bunting application Serial No. 256,112 filed November 13, 1951, now Patent No. 2,707,612.

Referring to Fig. 14 of the drawings, the valve 145 as shown comprises a casing 146 defining a cylindrical chamber 147 closed at one end. The casing is bolted or otherwise rigidly attached to the end of the ram cylinder 55 with the chamber 147 registering with an opening 145' in the ram cylinder. An outlet 148 for the chamber 147 is provided in one side wall of the casing 146. Chamber 147 defines a cylinder for a piston element 149 fixed on a tubular guide spindle 150 slidably received in a guide and packing collar 146' fitted into the opening 145' in the ram cylinder 55. At its outer end, the spindle is tapered as at 151 for cooperation with a valve seat 152 in the end wall of the casing to form a seal normally preventing flow of fluid from the ram cylinder. A compression spring 153 normally urges the piston 149 forwardly to maintain the sealing engagement of the spindle and to locate the piston forwardly of the outlet 148.

Pivotally supported on a lug 154 projecting from the end of the casing 146 is a lever 155 having its lower end positioned for coaction with a pair of push rods 156 slidably received in apertures in the end of the housing. When the lever 155 is rocked (clockwise as viewed in Fig. 14) the rods are shifted into engagement with the piston 149 to force it rearwardly along with the spindle 150 and thus break the seal to admit oil into the space between the casing and the piston. After this initial mechanical opening of the valve, the pressure of the fluid in the ram cylinder forces the piston back to uncover the outlet 148, thus allowing rapid release of all of the oil from the ram cylinder and the consequent substantially instantaneous dropping of the hitch linkage. As long as any oil pressure obtains in the system, the valve will remain open, thus giving the driver ample time to clear the tractor from the obstruction.

For actuating the valve 145 the invention provides a novel linkage providing an operative connection between the draft responsive element or plunger 35 and the valve lever 155. As shown in Figs. 10, 11 and 13, the release linkage comprises a rocker sleeve 160 mounted on the cross shaft 128 in proximity to the plunger 35 and having a radially projecting arm 161 projecting into the path of a shoulder 162 on the head 125 of the plunger. A pair of depending arms 163 rigid with the sleeve 160 and projecting radially therefrom are pivotally connected by a pin 164 with one end of a link 165 which has its other end pivoted by a pin 166 to the lower end of a hanger link 167 which is pivoted at its upper end on the shaft 93.

Adjacent its forward end, the link 165 is formed with a laterally projecting pad 168 engageable with one end of a rod 169 slidably mounted in supporting lugs 170 formed on the ram cylinder 55. A compression spring 171 urges the rod rearwardly to maintain it in contact with the pad 168. At its other end, the rod 169 is threaded for the reception of a cap 172 engageable with the upper end of the valve actuating lever 155. The cap 172 may be screwed onto or off the rod 169 to regulate the gap between the rod and the valve lever and thus determine the extent of movement of the plunger 35 and consequently the loading required to operate the release valve.

With the above arrangement, abnormal forward movement of the control plunger 35, as when an overload is encountered, will act through the linkage above described to initially open the valve 145. As explained above, this initial opening will bring about an immediate and full opening of the valve and a consequent quick venting of the ram cylinder.

*Operation*

The operation of the system will be readily understood upon reference to Figs. 15 and 16 of the drawings. Assuming that the implement is in transport position and the selector mechanism set for automatic draft control, the components of the control system and power unit will occupy the positions in which they are shown in Fig. 15. To place the implement in operation, the quadrant lever 80 is swung forwardly and downwardly, thus retracting the eccentric 87 from the pad 95 of the valve lever 90. The clearance 142 between the finger 131 and plunger-carried roller 127 permits the lever 90 to rock about the abutment 141 as a fulcrum under the urging of the spring 96 and this motion of the lever is transmitted to the valve plunger 71 which is shifted downwardly to open the drop ports. The piston 60 is thus permitted to advance into the ram cylinder due to the gravity load on the hitch linkage while the fluid is exhausted from the ram cylinder through the conduit 74, drop ports 73 and conduit 76. As the piston 60 enters the cylinder, the upper end of the lever 90 re-engages the eccentric 87 which becomes the fulcrum for the lever in subsequent operation of the system.

As the implement sinks into the ground, the soil resistance or draft increases resulting in application of a turning moment to the implement and imposition of a compressive force on the top linkage 26 which shifts the control plunger 35 forwardly. The roller 127, which serves as a limiting abutment for the finger 131, advances with the plunger and allows the lever 90 to swing about the fulcrum on the eccentric 87 under the action of the spring 96. It will be observed that the direction of the lever 90 is reversed under the above conditions and the valve plunger 71 is moved upwardly or toward the neutral position. When the draft on the implement corresponds in value to the setting of the quadrant lever, the valve 71 closes the drop ports thus preventing further downward movement of the hitch linkage and attached implement. It will be evident that the value of the selected draft load may be changed at will by simply varying the position of the quadrant lever and consequent movement of the eccentric 87 forwardly or rearwardly as the case may be.

It will be evident that the control mechanism will maintain the hydraulic system closed and thus keep the implement at a constant working depth as long as the draft load remains constant. If the draft decreases, due to the implement running shallow, there will be a corresponding rearward movement of the load responsive plunger 35 which movement is transmitted to the valve plunger to shift it in a direction to open the drop ports and bring about a lowering of the implement to restore the selected draft load. Similarly, if the draft load increases, due to the implement running too deep, the load responsive plunger 35 is shifted forwardly which initiates a raising of the valve plunger 71 to open the pump inlet ports 72. The pump is thus conditioned to supply fluid to the ram cylinder to raise the hitch linkage until the proper draft load is again attained and the system balanced with the valve plunger in a neutral position.

The "sensitivity" of the system may be regulated to provide optimum response for the particular implement attached to the hitch linkage or to meet the particular requirements of soil conditions encountered by manipulation of the hand lever 110. Swinging the lever in a clockwise direction (as viewed in Fig. 15) shifts the pin 107 toward the upper end of the slot in the lever 101 thus decreasing the sensitivity of the system or, in the other words, reducing the rate of response of the valve plunger 71 to movements of the control plunger 35. Conversely, the swinging of the lever 110 in a counterclockwise direction shifts the pin 107 toward the lower end of the slot in the lever 101 and increases the sensitivity of the system. By thus varying the rate of response in the system, it may be conditioned for most efficient operation with any type of implement from those characterized by heavy draft loads, such as plows, to those subject to relatively light loads, such as cultivators. The sensitivity may be adjusted at any time whether the implement is in working or transport position without interfering with the operation of either the draft control mechanism or the quadrant lever operation.

When it is desired to maintain the implement at a selected height without reference to the draft load on the hitch linkage, the system is conditioned for position control by manipulation of the hand lever 137 to withdraw the finger 131 from the path of the roller 127 and position the cam follower 136 for cooperation with the position control cam 82. This may be done most conveniently when the implement is in transport position at which time the parts of the control system occupy the positions shown in Fig. 16. With this arrangement, the cooperation between the cam 82 and eccentric 87 on the quadrant lever shaft actuates the valve linkage in a manner to cause the hitch linkage to follow the movements of the quadrant lever and assume a position corresponding to that in which the quadrant lever is set.

If the implement should encounter an obstruction or if for any other reason the draft load on the hitch linkage increases to a dangerous point, the control plunger 35 is advanced beyond its normal range and through the linkage provided for that purpose actuates the emergency release valve 145. This valve vents the ram cylinder 55 and brings about substantially instantaneous dropping of the linkage. In consequence, the traction load on the tractor's rear wheels is reduced to a point at which the wheels are free to spin and thus prevent damage to the implement or the tractor.

When it is desired to raise the implement to transport position, the quadrant lever 80 is swung to its uppermost position, thus rocking the lever 90 about its pivotal connection with the link 94. This results in upward movement of the valve plunger 71 and consequent opening of the pump ports 72. The pump consequently delivers pressure fluid to the ram cylinder until the valve is returned to neutral position. In the arrangement shown in Figs. 5, 6, 15 and 16, neutralization of the valve plunger 71 is accomplished by engagement of the piston 60 with the abutment 141 on the lever 90. In the preferred arrangement shown in Figs. 17 and 18 such neutralization is accomplished by engagement of the striker 62a directly with the extension 101a of the second lever 101, by-passing the lever 90 and link 100 to effect transport shutoff with the same slow, smooth action afforded by the relatively great length of the lever 101 and its extension 101a regardless of where the link 100 is engaged along the length of slot 106 for sensitivity adjustment. In either arrangement, as transport shutoff becomes complete, the valve linkage is physically disconnected from either control which may be in operative position by reason of the setting of the selector mechanism. Accordingly, the vibrations or oscillations of the implement are not transmitted to the linkage.

It will be apparent from the foregoing that the invention provides a control system of novel and improved construction, particularly useful for use in tractors equipped with power operated hitch linkages and load responsive controls. The sensitivity of the system may be quickly and easily adjusted to adapt the tractor for efficient operation with implements having an unusually wide range of variation in draft characteristics. By equally simple selective operations, the system may be conditioned for automatic draft control or for position control, as desired. The improved controls are simple in construction, efficient and reliable in operation, and are sufficiently compact to be readily accommodated within the space available in a tractor housing. By reason of the wide range of sensitivity adjustment afforded by the improved controls, the power operating system is readily applicable to tractors of considerably greater power than those previously equipped with such systems.

We claim as our invention:

1. In a power operating system for an implement hitch linkage mounted on a tractor for swing in a vertical plane, the combination of a hydraulic actuator, valve mechanism for controlling the supply to and exhaust of fluid from said actuator, a position control member movable in proportion to changes in the position of the hitch linkage, a draft responsive control element movable in proportion to changes in the draft load on an implement attached to the hitch linkage, valve shifting means including a rocking member supported adjacent said control element and said control member, a crank arm rigid with said rocking member, a linkage connecting said crank arm with said valve mechanism, and means including a spool non-rotatably mounted on said rocking member and slidable axially thereon to alternatively condition said position control member or said element for actuating said rocking member.

2. In a power operating system for an implement hitch linkage mounted on a tractor for swing in a vertical plane, the combination of a hydraulic actuator, valve mechanism for controlling the supply to an exhaust of fluid from said actuator, a position control member movable in proportion to changes in the position of the hitch linkage, a draft responsive control element movable in proportion to changes in the draft load on an implement attached to the hitch linkage, valve shifting means including a shaft supported adjacent said control element and said control member, a sleeve rotatably mounted on said shaft, a crank arm rigid with said sleeve, a linkage connecting said crank arm with said valve mechanism, a spool slidable axially of said sleeve between two operating positions and constrained for rotation with the sleeve, a pair of arms projecting from said spool, one of said arms being disposed in the path of said position control member in one position of the spool, the other of said arms being disposed in the path of said control element in the other position of the spool, and means for shifting said spool between said two positions.

3. In a power operating system for an implement hitch linkage mounted on a tractor for swing in a vertical plane, the combination of a hydraulic actuator, valve mechanism for controlling the supply to and exhaust of fluid from said actuator, a position control member movable in proportion to changes in the position of the hitch linkage, a draft responsive control element movable in proportion to changes in the draft load on an implement attached to the hitch linkage, valve shifting means including a rocking member supported adjacent said control element and said control member, a crank arm rigid with said rocking member, a linkage connecting said crank arm with said valve mechanism, and means for operatively connecting said rocking member with either said control member or said control element, said connections being effective for actuating said rocking member in one direction only.

4. A control system for tractors as called for by claim 1 wherein the spool is shiftable to a third position to render both the draft responsive element and the position control member ineffective to actuate the valve shifting means.

5. The combination in a tractor, of a hydraulic actuator including a cylinder and piston, valve mechanism controlling the supply of pressure for said actuator, draft responsive means including a shiftable plunger for actuating said valve mechanism, an emergency release valve connected to said cylinder adapted when opened to vent the cylinder, means for opening said valve comprising an operating lever pivoted on the valve, a first push rod supported on said cylinder for endwise sliding movement and having one end positioned to engage said lever, a second push rod supported at one end on a depending link pivoted on the tractor housing, a journaled rocker sleeve having a radial arm disposed in a position to be engaged by said plunger when it is shifted beyond its normal range of travel, a pivotal connection between the other end of said second rod and said radial arm, and abutment means on said second rod positioned to engage said first rod when the second rod is shifted by said plunger, whereby said plunger is normally totally free of said valve opening means and unimpeded for actuating said valve mechanism.

6. In a tractor having a trailingly pivoted implement hitch linkage, a hydraulic actuator operable to raise and lower the linkage, and a source of pressure fluid for the actuator, the combination of means for controlling the operation of the actuator including a valve mechanism controlling the pressure fluid supply for the actuator and shiftable in opposite directions from a neutral position to effect movement of said actuator in opposite directions, a control element adapted to be displaced progressively from a neutral position in opposite directions in proportion to the draft load on the hitch linkage, means for transmitting the movements of said element to said valve mechanism including a first lever connected to said element, a second lever connected to said valve mechanism, a link connecting said levers to swing in unison, means for changing the position of said link with respect to one of said levers to vary the amplitude of movement of said one lever relative to the movement of the other lever, and means connected with the actuator and operative directly upon said second lever to neutralize said valve mechanism upon movement of the actuator to elevate the hitch linkage to transport position.

7. In a control system for an implement hitch linkage trailingly pivoted to a tractor and including a hydraulic actuator operable on a rockshaft connected to raise and lower the linkage, and a source of pressure fluid for the actuator, the combination comprising a valve mechanism shiftable in opposite directions from a neutral position for the supply of pressure fluid to the actuator, a control plunger adapted to be displaced from a predetermined position in proportion to the draft load on the hitch linkage, means for transmitting the movements of said plunger to said valve mechanism including a first lever connected to be moved by said plunger, a second lever connected to actuate said valve mechanism, a link pivoted between said lever to swing them in unison, means for adjusting the pivot connection of said link along the length of said second lever to vary the amplitude of movement of the latter relative to said first lever, and means on said rockshaft operative directly on said second lever to neutralize said valve mechanism when the hitch linkage is raised to a predetermined transport position regardless of the setting of said adjusting means.

8. In a tractor having a trailingly pivoted implement hitch linkage, a hydraulic actuator operable to raise and lower the linkage, and a source of pressure fluid for the actuator, the combination of a valve mechanism for controlling the pressure fluid supply for the actuator and shiftable in opposite directions from a neutral position to initiate raising or lowering of the linkage, a control element adapted to be displaced progressively from a neutral position in opposite directions in proportion to the draft load imposed on the hitch linkage, a first lever connected to said element to be pivoted by movements of the latter, a second lever connected to said valve mechanism to position the latter and having a longitudinally extending, arcuate slot defined therein, a link pivoted to said first lever and carrying a pin slidably disposed in said slot to thereby connect said levers to swing in unison, means for rocking said link about its pivotal connection with said first lever to variably position said pin in said slot and adjust the relative swing of said levers, manually operated means for rocking said first lever to effect raising and lowering of the hitch linkage, and striker means connected to move with the actuator and engageable directly with said second lever to rock the same and neutralize said valve mechanism when the hitch linkage is raised to a predetermined transport position, irrespective of the positional setting of said pin in said slot.

9. In a hitch linkage control mechanism having a rockshaft, a hydraulic actuator connected to rock the rockshaft against a load, a source of pressure fluid, and a valve mechanism movable in opposite directions from a neutral position to supply or drain pressure fluid from the actuator, the combination comprising a spring-biased control plunger axially movable under a controlling force, means to rock said rockshaft in response to movement of said plunger including a first lever operatively connected to be pivoted by said plunger, a second lever connected to said valve mechanism, a link pivotally connected between said levers to swing them in unison, means for varying the point of connection of said link to said second lever for adjusting the ratio of angular displacement for said levers, a manual control lever operatively connected to swing said first link and thereby initiate filling or draining of pressure fluid from the actuator, and a striker on said rockshaft adapted to engage said second lever and neutralize said valve mechanism when said rockshaft reaches a predetermined position as the actuator is being filled.

10. In a tractor having a trailingly pivoted implement hitch linkage, a rockshaft connected to raise and lower the linkage, a hydraulic ram connected to rotate the rockshaft, a source of pressure fluid and a control valve movable in opposite directions from a neutral position to connect said ram to said source or to vent said ram, respectively; the combination with means for positioning the rockshaft in response to draft forces on the hitch linkage including a spring-biased plunger adapted to be moved proportionally by such draft forces, a first lever operatively connected with said plunger, a second lever operatively connected with said valve, and a link pivoted between said levers to rock the same in unison; of means for varying the sensitivity of said draft responsive means including an arcuate slot defined in said second lever, a pin on said link slidable in said slot, and means for adjustably rocking said link about its pivot connection to said first lever; of manually operated means for initiating raising or lowering of the hitch linkage including a hand lever adapted to rock said first lever; and of means for terminating the raising of the hitch linkage at a predetermined transport position irrespective of the adjustment of said link including a striker on said rockshaft position to engage said second lever and neutralize said valve when the hitch linkage reaches said transport position.

11. In a tractor having a trailingly pivoted implement hitch linkage, a hydraulic actuator operable to raise and lower the linkage, and a source of pressure fluid for the actuator, the combination of means for controlling the operation of the actuator including a valve mechanism controlling the pressure fluid supply for the actuator, and shiftable in opposite directions from a neutral position to effect movement of said actuator in opposite directions, a manual control lever adapted to be rocked in opposite directions, means for transmitting the movements of said control lever to said valve mechanism including a first lever operatively connected to be rocked by said control lever, a second lever connected to said valve mechanism, a link connecting said first and second levers to swing in unison to thereby effect movement of the actuator in opposite directions, means for changing the position of said link with respect to one of said first and second levers to vary the amplitude of movement of said one lever relative to the other lever, and means movable with the actuator and operative directly upon said second lever to neutralize said valve mechanism upon movement of the actuator to elevate the hitch linkage to transport position.

12. In a tractor having a trailingly pivoted implement hitch linkage, a hydraulic actuator operable to raise and lower the linkage, a source of pressure fluid for the actuator, and a control valve having a plunger shiftable in opposite directions from a neutral position to control the supply of pressure fluid for the actuator to effect movement of the latter in opposite diretcions, the combination of an element shiftable in opposite directions, means for transmitting the movements of said element to said valve plunger including a first lever connected to said element, a second bell-crank lever having a relatively short arm connected to said plunger and a relatively long arm, a link pivotally connecting said first lever and long arm to swing in unison, means for changing the position of connection of said link along said long arm to vary the amplitude of movement of said second lever relative to the movement of the first lever, and means movable with the actuator and operative directly upon the end portion of said long arm to neutralize said plunger upon movement of the actuator to a predetermined transport position.

13. In a tractor having an elevatable hitch linkage and a power actuator for effecting raising and lowering of the linkage, the combination comprising means including a control element shiftable in opposite directions for controlling movements of the actuator, a draft-responsive member shiftable in proportion to draft forces on the linkage, a variable ratio mechanism operatively connecting said control element to be displaced in adjustable proportion to movement of said draft-responsive member, said mechanism including a first lever connected to be rocked upon movement of said draft-responsive member and a second lever operatively connected between said first lever and said control element, and means movable with said actuator and engageable with said second lever for positioning said control element to stop the draft links in a predetermined transport position as they are elevated by said actuator.

14. In a tractor having a trailingly pivoted implement hitch linkage, a hydraulic actuator operable to raise and lower the linkage, and a source of pressure fluid for the actuator, the combination of means for controlling the operation of the actuator including valve mechanism controlling the pressure fluid supply for the actuator and shiftable in opposite directions from a neutral position to initiate raising or lowering of the linkage, a control element adapted to be displaced progressively from a neutral position in opposite directions in proportion to the draft load imposed on the hitch linkage, means for transmitting the movements of said element to said valve mechanism including a first lever connected to said element, a second lever connected to said valve mechanism, said second lever having a longitudinally extending slot, a link pivoted adjacent one end of said first lever and having an extension projecting beyond the pivot point, a pin carried by said link adjacent its other end engageable in said slot to operatively connect the link with said second lever, an adjusting mechanism and means connecting it with said extension for rocking said link about its pivotal connection with said first lever to variably position said pin in said slot, said connecting means being proportioned to shift the pin in the slot sufficiently to compensate for changes in the location of the pivotal connection of the link with the first lever as the latter swings in response to the action of the draft responsive means.

15. In a tractor having a trailingly pivoted implement hitch linkage, a hydraulic actuator operable to raise and lower the linkage, and a source of pressure fluid for the actuator, the combination of means for controlling the operation of the actuator including valve mechanism controlling the pressure fluid supply for the actuator and shiftable in opposite directions from a neutral position to initiate raising or lowering of the linkage, a control element adapted to be displaced progressively from a neutral position in opposite directions in proportion to the draft load imposed on the hitch linkage, means for transmitting the movements of said element to said valve mechanism including a suspension link pivoted to the tractor, a first lever, a common pivot connecting said first lever to said suspension link and to said control element, a second lever connected to said valve mechanism, a link connecting said levers to swing in unison, and means for changing the position of said connecting link wtih respect to one of said levers to vary the amplitude of movement of said one lever relative to the movement of the other lever.

16. In a tractor having a trailingly pivoted implement hitch linkage, a hydraulic actuator operable to raise and lower the linkage, and a source of pressure fluid for the actuator, the combination of means for controlling the operation of the actuator including a valve mechanism controlling the pressure fluid supply for the actuator and shiftable in opposite directions from a neutral position to initiate raising or lowering of the linkage, a control element displaceable progressively in opposite directions in proportion to the draft load imposed on the hitch linkage, a suspension link pivoted at its upper end to the tractor, a first lever pivotally connected to and supported by the lower end of said suspension link at a point beneath the upper end of said first lever, a manually shiftable abutment pivotally bearing against the upper end of said first lever, means pivotally connecting said control element upon displacement thereof to rock said first lever about said abutment as a fulcrum, a second lever connected to said valve mechanism, a link connecting said first and second levers to swing in unison, and means for changing the position of said connecting link with respect to one of said levers to vary the amplitude of movement of said valve mechanism relative to the movement of said control element.

References Cited in the file of this patent

UNITED STATES PATENTS

| 2,118,181 | Ferguson | May 24, 1938 |
| 2,677,322 | Bunting | May 4, 1954 |
| 2,715,863 | Bunting | Aug. 23, 1955 |

FOREIGN PATENTS

| 272,004 | Italy | Feb. 5, 1930 |